United States Patent [19]
Johnson et al.

[11] 3,753,128
[45] Aug. 14, 1973

[54] GATED AMPLIFIER CONTROL WITH PROVISION FOR SUPPLEMENTARY CONTROL

[75] Inventors: Daniel Johnson, Guilderland; Arne Loft, Scotia, both of N.Y.

[73] Assignee: General Electric Company, Schenectady, N.Y.

[22] Filed: May 8, 1972

[21] Appl. No.: 250,911

[52] U.S. Cl.............. 328/71, 307/235 R, 307/241, 328/70, 328/147, 330/1 A
[51] Int. Cl. ............................................ H03k 17/02
[58] Field of Search .......................... 307/235, 241; 328/70, 71, 146, 147; 330/1 A, 84

[56] References Cited
UNITED STATES PATENTS
3,601,711  8/1971  Richardson .................... 330/1 A

*Primary Examiner*—John Zazworsky
*Attorney*—William C. Crutcher et al.

[57] ABSTRACT

Two or more operational amplifiers with provision for closed loop feedback control of a primary controlled device are provided with a gating circuit which permits only one of the amplifiers to control at any one time. One or more of the amplifiers further includes a supplementary feedback circuit which becomes operative when the amplifier loses control of the primary device. This places the amplifier in control of a supplementary controlled device.

7 Claims, 1 Drawing Figure

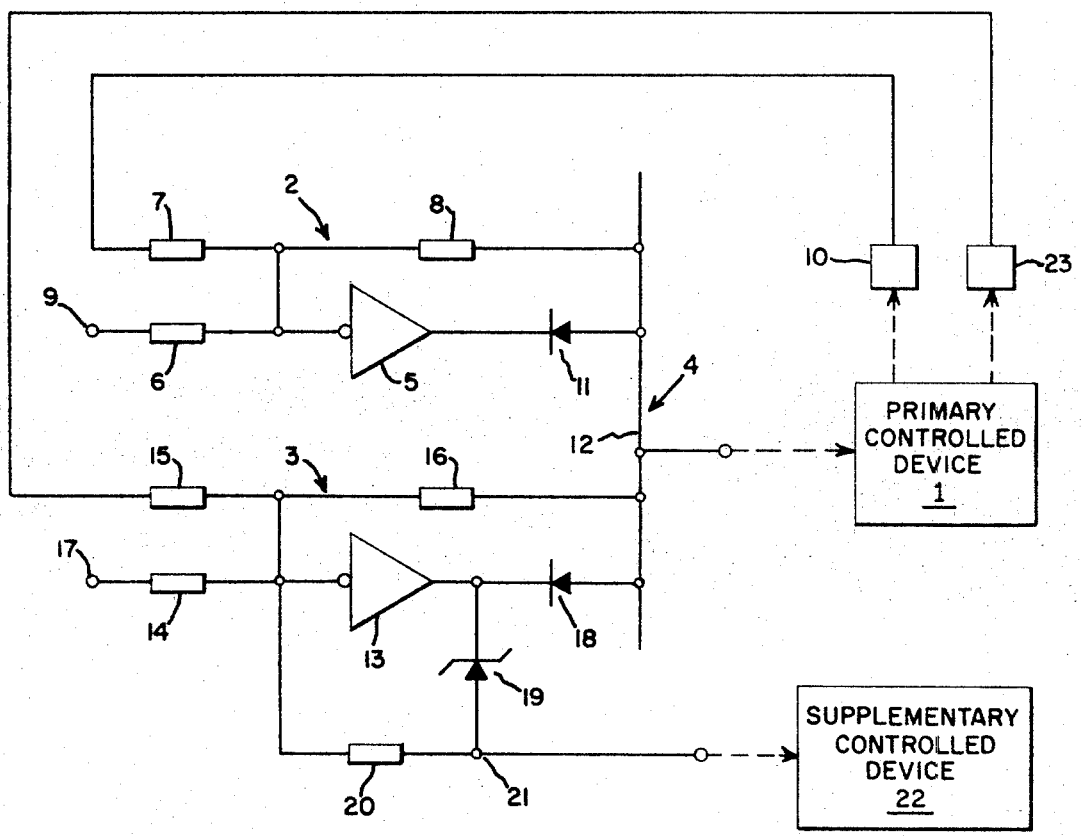

3,753,128

GATED AMPLIFIER CONTROL WITH PROVISION FOR SUPPLEMENTARY CONTROL

BACKGROUND OF THE INVENTION

This invention relates generally to amplifier circuits for control systems having more than one closed loop control channel for the primary controlled device. More particularly, it relates to an improvement in such control systems by adding provision for controlling another device through a supplementary control channel.

Amplifier control circuits are known which employ two or more operational amplifiers controlling through a common gating device, which permits only the higher or the lower of the output signals from the respective amplifiers to acutally do the controlling at any one time. Examples of such controls are more fully described in U.S. Pat. No. 3,340,883 to J. R. Peternel and in U. S. Pat. 3,520,133 to A. Loft and D. Johnson, both of the aforesaid patents being assigned to the present assignee and incorporated herein by reference. In those patents, the primary controlled devices are respectively a steam turbine and a gas turbine.

On some occasions, it would be desirable to have a supplementary device controlled from the same circuitry. For example, if the primary controlled device is a gas turbine and there are alternate control channels directing fuel flow, so that fuel is limited either by temperature or speed, a shift to operation on temperature control may indicate that the gas turbine is approaching capacity limits. In this case, it would be desirable to add another supplementary controlled device such as a helper steam turbine or to provide steam injection to the gas turbine for power augmentation at the precise time that the gas turbine is limited by temperature conditions. Also, where there are two or more amplifier control channels to the primary device, there exists the possibility of introducing manufacturing economies by controlling the supplementary device from an otherwise inactive amplifier channel.

Accordingly, one object of the present invention is to provide an improvement in a control system having two or more gated amplifiers which provides for controlling or turning on a supplementary device in addition to the primary controlled device.

Another object of the invention is to provide an improved amplifier control circuit with two or more control channels which permits controlling a supplementary device from an inactive primary control channel.

SUMMARY OF THE INVENTION

Briefly stated, the invention is practiced by providing at least two closed loop primary control channels to a primary controlled device with a gate permitting control by only one channel at a time. A supplementary control channel is provided for one or more of the amplifiers by means of a voltage-responsive switch connected at the amplifier output which is arranged to operatively connect a supplementary feedback impedance across the amplifier. This supplementary control channel is adapted to control another device when the amplifier is not controlling the primary device.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which the single FIGURE shows a simplified schematic drawing of a control circuit illustrating the present invention.

DESCRIPTION OF THE PREFERRED EMBODIMENT

Referring to the drawing, a control circuit for a primary controlled device indicated at 1 comprises two primary control channels shown generally at 2 and 3. Only one of the channels 2 or 3 exercises control over device 1 at any one time, through utilization of a gate shown generally at 4. In accordance with the teachings of the Loft et al patent referred to above, any number of control channels such as 2, 3 may be supervised by gate 4 and each control channel may exercise control in accordance with a different type of measured operating condition or parameter of device 1, such as temperature, speed, acceleration, fuel flow, vibration, etc.

Control channel 2 includes a high gain operational amplifier of a type which is commercially available and well known in the art having connected at its input end a reference impedance 6, an external feedback impedance 7 and an internal feedback impedance 8. Reference impedance 6 is connected at its other end to an input terminal 9 adapted to receive a reference or setpoint voltage corresponding to a desired operating condition of the controlled device 1, such as temperature. If temperature is the selected operating condition, then the actual temperature of device 1 is measured and converted by means of a transducer 10 to a voltage, which is applied at the other end of external feedback impedance 7. The output end of amplifier 5 is connected to one side of a diode 11 and the other side of the diode is connected to a common gating bus 12. Bus 12 is then connected to the internal feedback impedance 8 leading back to the input end of the operational amplifier 5, completing the control channel 2.

Such a control channel as channel 2, in the absence of another control channel, will control the operation of device 1, according to the reference setpoint voltage applied at input terminal 9 and the characteristics of impedances 6, 7 and 8. As is well known in the art, for a proportional control, impedances 6, 7 and 8 may be simple resistors. Any desired degree of sophistication may be obtained by using passive networks for these impedances. For example, if internal feedback network 8 is a simple capacitor, integration is performed by amplifier 5. By more complex RC passive networks, any type of "transfer function" may be obtained to affect the control channel under transient conditions.

Control channel 3 includes the same basic elements as channel 2, comprising an operational amplifier 13, reference impedance 14, external feedback impedance 15, internal feedback impedance 16, input terminal 17 and diode 18. Although impedances 14, 15 and 16 appear on the drawing to be identical to comparable members 6, 7 and 8, it will be understood that, in actuality, these may take different forms in order to obtain different transfer functions and to suit the selected operating condition which is being controlled. A transducer 23 converting the sensed condition to a voltage completes control channel 3.

The two diodes 11, 18, together with the common bus 12 make up the gate 4. Gate 4 only allows one of the amplifiers 5, 13 to be active at any one time in exercising control over device 1, when its respective diode 11, 18 is conducting. In the channel which is not exercising control, the diode will be blocked as described more fully hereinafter and the amplifier will normally saturate to a relatively high output voltage depending upon its design.

In accordance with the present invention, a supplementary control channel is provided which operates using amplifier 13. A voltage-responsive switch is connected at the amplifier output ahead of gating diode 18. In the arrangement shown, this is provided simply by a Zener or break-down diode 19. The other side of break-down diode 19 is connected to a supplementary feedback impedance 20 which, in turn, is connected to the input of the operational amplifier. A junction 21 between the break-down diode 19 and the supplementary feedback impedance 20 is connected to a supplementary controlled device 22.

The characteristics of break-down diode 19 are selected such that the threshold voltage at which the diode will begin to conduct is above the range of normal operating output voltages of the operational amplifier 13 when diode 18 is conducting. However, when the operational amplifier starts to saturate (because the gating diode 18 is blocked) its output voltage will be above the threshold voltage of diode 19 and diode 19 will begin to conduct.

It will be apparent to those skilled in the art that the voltage-responsive switch may take various forms. An alternate arrangement would be to connect a potentiometer between the amplifier output and a negative voltage source. The wiper on the potentiometer is then connected through an ordinary diode to impedance 20. The diode will therefore conduct at a selected voltage output from the amplifier.

The nature of the supplementary controlled device 22 or the type of control exercised over it is immaterial to the present invention. It may be a device which operates in close conjunction with the primary controlled device, for example a gas turbine, to assist it in some phase of operation, such as a helper steam turbine added at peaking load or a steam injection device turned on to augment power. In this case the supplementary device 22 affects the operating conditions of the primary device 1 and changes are communicated via transducers 10, 23 into the primary control channels. Alternatively, the device 22 may have quite a remote relationship to primary controlled device 1, such as turning on monitoring, telemetering or recording equipment. The type of control exercised over device 22 may be simply to actuate a relay or the signal applied from junction 21 may serve as a reference or setpoint for a separate closed loop control system.

OPERATION

The operation of the invention is as follows. Each of the primary control channels 2, 3 attempts to exercise control over device 1 in accordance with the setpoint voltages applied at input terminals 9, 17. This is done by generating an output voltage from each operational amplifier so as to satisfy the zero summation of currents flowing through the three impedances connected to its input summing junction. The polarity convention selected in the circuit shown is such that, positive voltages appear at the amplifier outputs. Because of the polarity connections of gating diodes 11, 18, only one of the diodes will conduct at any one time. The voltage appearing on bus 12 will be the lowest positive voltage among those output voltages which the various amplifiers are attempting to maintain. Thus gate 4 in the connections shown is often termed a "low value" gate. The amplifier attempting to provide the lowest output signal thus becomes the "active" amplifier in the sense that it is actually controlling device 1. The other amplifier (as well as any additional amplifiers if there are more than two), which is attempting to maintain a higher positive voltage than that on bus 12 will cause reverse polarity on its gating diode. This will cause its diode to block the flow of current and the amplifier will quickly tend to saturate and the output voltage will rise to a much higher level. This amplifier then is "inactive," in the sense that it is no longer controlling device 1.

When amplifier 13 is active and its gating diode 18 is conducting, the break-down diode 19 is cut off since its normal output voltage is below the threshold voltage of diode 19. Amplifier 13 exercises control over device 1. However, when the other amplifier 5 becomes active, gating diode 18 is blocked. Output voltage of amplifier 13 increases and break-down diode 19 begins to conduct allowing current flow through supplementary feedback impedance 20. This serves to open a supplementary control channel to device 22.

A voltage appears at junction 21 which is determined in accordance with the reference voltage at input terminal 17 and in accordance with the characteristics selected for impedances 14 and 20. Impedance 20 may be a simple resistor for proportional control, or may be a capacitor if integral control is desired, or may be further refined into a passive network in accordance with the desired transfer function.

It may be emphasized again at this point, that the invention is shown in its simplest form. Any number of control channels such as 2 and 3 may be added. The amplifiers for any number of these added control channels may be outfitted with voltage-responsive switches for connecting supplementary feedback impedances to operate as many supplementary controlled devices. These supplementary devices will be placed in control when the amplifiers are "inactive" as to control of the primary controlled device.

While there has been shown what is considered to be the preferred embodiment of the invention, it is desired to cover in the appended claims all such modifications and extensions as fall within the true spirit and scope of the invention.

What is claimed is:

1. In a control system for a primary controlled device and a supplementary controlled device, the combination of:

a plurality of primary control channels responsive to operating conditions of said primary device and respectively connected to control said device in accordance with a setpoint signal representative of a desired operating condition, each of said primary control channels comprising an operational amplifier with an internal feedback impedance, gating means connected to block the signal from all but one of said operational amplifiers to the primary device at any one time, so that only one primary control channel actively controls said primary device, and a supplementary control channel including a supplementary feedback impedance operatively connected across at least one of said operational amplifiers by means of a voltage-responsive switch and adapted to provide a control signal to said supplementary controlled device when said gating means blocks the signal from that amplifier to the primary device.

2. The combination according to claim 1, wherein said voltage-responsive switch comprises a break-down diode connected on one side thereof to the output from said amplifier and selected to conduct current when a threshold voltage is exceeded by the amplifier output voltage, said break-down diode being connected in series with said supplementary feedback impedance to the amplifier input, and means connected between the break-down diode and the supplementary feedback impedance for providing a control signal to the supplementary controlled device.

3. The combination according to claim 1, wherein said gating means comprises a plurality of gating diodes each connected in series between the output end of a respective operational amplifier and a common bus and arranged to block current flow when the amplifier output voltage exceeds the bus voltage.

4. The combination according to claim 3, wherein said voltage-responsive switch comprises a break-down diode having one side connected between the output end of a selected amplifier and its associated gating diode, the other side being connected to said supplementary feedback impedance and also to said supplementary controlled device, the other side of said supplementary feedback impedance being connected to the input end of the selected amplifier.

5. The combination according to claim 1, wherein each of said primary control channels includes an input impedance and an external feedback impedance connected to the input end of a respective operational amplifier and means for applying voltages to said input and external feedback impedances respectively representing a desired condition and an actual operating condition of the primary controlled device.

6. The combination according to claim 5, wherein said supplementary device is adapted to affect the operating conditions of the primary device thereby providing feedback into said primary control channels.

7. In a control system for a primary controlled device and a supplementary controlled device, the combination of:

a plurality of primary control channels responsive to operating conditions of said primary device and respectively connected to control one of said operating conditions in accordance with a setpoint, each of said primary control channels comprising an operational amplifier with an input impedance, an external feedback impedance and an internal feedback impedance, all connected to its input end and a diode connected to its output end, the other side of said diode and said internal feedback impedance, both being connected to a gating bus common to the other primary control channels, means providing a reference voltage representing a desired operating condition to said input impedance of each amplifier, means providing a voltage representing an actual operating condition of the primary controlled device to said external feedback impedance of each amplifier, and at least one of said primary control channels having a supplementary control channel associated with its operational amplifier comprising a break-down diode and a supplementary feedback impedance connected in series from the output end of said amplifier to the input end thereof, the junction between said break-down diode and supplementary feedback impedance being also adapted to supply an output signal to a supplementary controlled device.

* * * * *